United States Patent
Takahashi

(10) Patent No.: US 8,927,089 B2
(45) Date of Patent: Jan. 6, 2015

(54) SHEET MATERIAL HAVING A CONCAVE-CONVEX PART, AND A VEHICLE PANEL AND LAMINATED STRUCTURE USING THE SAME

(75) Inventor: Masaya Takahashi, Aichi-ken (JP)

(73) Assignee: Uacj Corporation, Tokyo (JP)

( * ) Notice: Subject to any disclaimer, the term of this patent is extended or adjusted under 35 U.S.C. 154(b) by 0 days.

(21) Appl. No.: 13/979,106

(22) PCT Filed: Dec. 13, 2011

(86) PCT No.: PCT/JP2011/078740
§ 371 (c)(1),
(2), (4) Date: Jul. 10, 2013

(87) PCT Pub. No.: WO2012/096085
PCT Pub. Date: Jul. 19, 2012

(65) Prior Publication Data
US 2013/0288015 A1    Oct. 31, 2013

(30) Foreign Application Priority Data

Jan. 11, 2011   (JP) .................................. 2011-002767

(51) Int. Cl.
| | | |
|---|---|---|
| *B32B 3/30* | (2006.01) | |
| *B32B 3/00* | (2006.01) | |
| *E04C 2/32* | (2006.01) | |
| *B60J 5/04* | (2006.01) | |
| *B21D 47/00* | (2006.01) | |
| *B62D 25/10* | (2006.01) | |

(52) U.S. Cl.
CPC ................. *B60J 5/045* (2013.01); *B21D 47/00* (2013.01); *B62D 25/105* (2013.01)
USPC ........... 428/180; 428/687; 428/603; 428/182; 428/183; 428/187; 52/783.11; 52/850

(58) Field of Classification Search
USPC ............ 428/598, 687, 595, 604, 603, 59, 60, 428/66.5, 79, 180, 182, 183, 187, 179; 181/284, 293; 52/220.4, 554, 783.11, 52/789.1, 790.1, 798.1, 850; 264/509; D25/138, 152, 157, 141, 143, 144, 125, D25/149, 158, 160, 163; D12/195, 196; D5/54; 296/187.12
See application file for complete search history.

(56) References Cited

U.S. PATENT DOCUMENTS

| 1,074,824 A | 10/1913 | Wadsworth |
|---|---|---|
| D71,046 S | 9/1926 | Boyd |

(Continued)

FOREIGN PATENT DOCUMENTS

| JP | 59-44366 | 3/1984 |
|---|---|---|
| JP | 9-254955 | 9/1997 |

(Continued)

OTHER PUBLICATIONS

STIC search, Jul. 2014.*

(Continued)

*Primary Examiner* — Michele L Jacobson
*Assistant Examiner* — Seth Dumbris
(74) *Attorney, Agent, or Firm* — J-Tek Law PLLC; Jeffrey D. Tekanic; Scott T. Wakeman

(57) ABSTRACT

A sheet material (1) includes a stiffness-increasing concave-convex part (20). A first reference plane (K1), an intermediate reference plane (K3), and a second reference plane (K2) serve as a reference system. First reference areas (213), which have a specific shape, and second reference areas (223), which are all areas other than the first reference areas (213), are disposed in the intermediate reference plane (K3). The concave-convex part (20) is formed of first areas (21) as well as second areas (22) and/or plane areas (23).

20 Claims, 10 Drawing Sheets

(56) References Cited

U.S. PATENT DOCUMENTS

| | | | |
|---|---|---|---|
| 1,957,654 A | 5/1934 | La Brie | |
| 2,380,447 A | 7/1945 | Jungersen | |
| 2,481,046 A * | 9/1949 | Scurlock | 428/593 |
| D173,158 S | 10/1954 | Johnson | |
| 2,699,599 A * | 1/1955 | Potchen | 428/604 |
| D178,569 S | 8/1956 | Hutchinson | |
| 2,858,247 A * | 10/1958 | De Swart | 428/180 |
| D188,648 S | 8/1960 | Cohen et al. | |
| 2,954,838 A | 10/1960 | Nuorivaara | |
| D190,068 S | 4/1961 | Vernon | |
| 3,011,602 A | 12/1961 | Ensrud et al. | |
| 3,096,032 A | 7/1963 | Davis | |
| 3,118,523 A | 1/1964 | Girot | |
| 3,302,359 A | 2/1967 | Alleaume | |
| 3,362,118 A | 1/1968 | Brunner | |
| 3,407,788 A | 10/1968 | Hagmann | |
| 4,146,666 A | 3/1979 | Houtlosser | |
| 4,411,121 A | 10/1983 | Blacklin et al. | |
| 4,588,258 A | 5/1986 | Hoopman | |
| 4,672,780 A | 6/1987 | Lockwood | |
| D313,512 S | 1/1991 | Legare | |
| 5,122,902 A | 6/1992 | Benson | |
| 5,292,027 A | 3/1994 | Lueke | |
| 5,399,406 A | 3/1995 | Matsuo et al. | |
| 5,612,117 A | 3/1997 | Belanger et al. | |
| 5,889,615 A | 3/1999 | Dreyer et al. | |
| 6,120,280 A | 9/2000 | Mimura et al. | |
| 6,136,416 A | 10/2000 | Smith et al. | |
| 6,383,607 B1 | 5/2002 | Shin | |
| 6,824,856 B2 * | 11/2004 | Jones | 428/172 |
| D625,110 S | 10/2010 | Koenig | |
| D673,779 S | 1/2013 | Takahashi | |
| D680,749 S | 4/2013 | Takahashi | |
| D680,750 S | 4/2013 | Takahashi | |
| D685,194 S | 7/2013 | Takahashi | |
| 2007/0015000 A1 | 1/2007 | Burdon | |
| 2007/0184144 A1 | 8/2007 | Akishev et al. | |
| 2012/0269998 A1 | 10/2012 | Takahashi | |
| 2013/0108885 A1 | 5/2013 | Takahashi | |

FOREIGN PATENT DOCUMENTS

| | | |
|---|---|---|
| JP | 10-166481 | 6/1998 |
| JP | 11-501587 | 2/1999 |
| JP | 2960402 B1 | 7/1999 |
| JP | 2000-136720 | 5/2000 |
| JP | 2000-257441 | 9/2000 |
| JP | 2000-288643 | 10/2000 |
| JP | 3332353 | 7/2002 |
| JP | 2002-307117 | 10/2002 |
| JP | 2002-307227 | 10/2002 |
| JP | 2002-321018 | 11/2002 |
| JP | 2003-261070 | 9/2003 |
| JP | 2004-26120 | 1/2004 |
| JP | 2004-106022 | 4/2004 |
| JP | 2004-218232 | 8/2004 |
| JP | 2005-232751 | 9/2005 |
| JP | 2006-137029 | 6/2006 |
| JP | 2006-305999 | 11/2006 |
| JP | 2007-23661 | 2/2007 |
| JP | 2007-55143 | 3/2007 |
| JP | 2007-112356 | 5/2007 |
| JP | 2007301865 A | 11/2007 |
| JP | 2008-180125 | 8/2008 |
| JP | 4388558 | 10/2009 |
| JP | 2009-257342 | 11/2009 |
| JP | 2011-27248 | 2/2011 |
| JP | 2011-101893 | 5/2011 |
| JP | 2011-110847 | 6/2011 |
| JP | 2011-147950 | 8/2011 |
| JP | 2011-156581 | 8/2011 |
| JP | 2011-202350 | 10/2011 |
| JP | 2011-230174 | 11/2011 |
| JP | 2012-30261 | 2/2012 |
| WO | 03/056111 | 7/2003 |
| WO | 2005058521 A | 6/2005 |
| WO | 2007/010868 | 1/2007 |
| WO | 2011/058922 | 5/2011 |
| WO | 2012/008059 | 1/2012 |

OTHER PUBLICATIONS

English translation of International Preliminary Report on Patentability from parent PCT application No. PCT/JP2011/078740.
U.S. Appl. No. 13/820,980, filed Mar. 5, 2013.
English translation of International Preliminary Report on Patentability from parent PCT application No. PCT/JP2011/078740, Available Jul. 11, 2013.
English translation of International Search Report from parent application No. PCT/JP2011/078740, Available Jul. 11, 2013.
Unpublished U.S. Appl. No. 13/993,492, filed Jun. 12, 2013.
Communication mailed Dec. 10, 2013 from the European patent application in counterpart EP application No. 10854741, including European Search Opinion, Supplementary European Search Report and examined claims 1-13.
Non-final Office Action mailed Jan. 7, 2014 for related U.S. Appl. No. 13/508,822.

* cited by examiner

SHEET MATERIAL HAVING A CONCAVE-CONVEX PART, AND A VEHICLE PANEL AND LAMINATED STRUCTURE USING THE SAME

CROSS-REFERENCE

This application is the US national stage of International Patent Application No. PCT/JP2011/078740 filed on Dec. 13, 2011, which claims priority to Japanese Patent Application No. 2011-002767 filed on Jan. 11, 2011.

TECHNICAL FIELD

The present invention relates to a sheet material whose stiffness is increased by the formation of a concave-convex part, and to a vehicle panel and a laminated structure that are configured using the same.

BACKGROUND ART

With the aim of reducing the weight of, for example, an automobile, the potential replacement of the material of components comprising steel sheets and the like with a lightweight material such as an aluminum alloy sheet is being studied and implemented. In such a case, assuming that the weight is reduced, it is necessary that the required stiffness be ensured.

To date, studies conducted to increase stiffness without increasing the thickness of the sheet material have provided the sheet material with a wave shape, a concave-convex shape, and the like, and the stiffness has been increased by virtue of the shape.

As an example of implementing a convex-concave shape, one of the components, called a heat insulator, of an automobile is formed of a sheet material. As a material therefor, Patent Document 1 proposes the formation of numerous protruding parts by embossing in order to ensure sufficient stiffness without increasing sheet thickness. In addition, sheet materials have also been proposed (refer to Patent Documents 2-7) that increase stiffness not only in a heat insulator but also in various applications by forming a concave-convex part via embossing and the like.

PRIOR ART LITERATURE

Patent Documents

Patent Document 1
  Japanese Patent No. 4388558
Patent Document 2
  Japanese Patent No. 3332353
Patent Document 3
  Japanese Unexamined Patent Application Publication No. 2000-257441
Patent Document 4
  Japanese Unexamined Patent Application Publication No. H9-254955
Patent Document 5
  Japanese Unexamined Patent Application Publication No. 2000-288643
Patent Document 6
  Japanese Unexamined Patent Application Publication No. 2002-307117
Patent Document 7
  Japanese Unexamined Patent Application Publication No. 2002-321018

SUMMARY

A sheet material wherein corrugations, numerous concave-convex parts, and the like are formed as mentioned above is actually stiffer than a flat sheet in which concave-convex parts are not formed. Nevertheless, the stiffness of a sheet material provided with a corrugated shape has directionality, namely, there are cases wherein even though the stiffness increases in one direction, the desired stiffness increase effect is not obtained in another direction. In addition, in the sheet material provided with the concave-convex part described in Patent Document 1, Patent Document 2, and the like, even though stiffness anisotropy is reduced, the stiffness increase effect thereof is approximately only two times and the weight reduction effect thereof is approximately only 20% of a flat sheet wherein the concave-convex part is not formed, and these effects cannot necessarily satisfy the demand. Consequently, it cannot be said that the optimal concave-convex part shape that both increases stiffness and reduces weight has yet been elucidated, and there is always a demand for further increases in the stiffness increase effect and the weight reduction effect. In addition, apart from the need to reduce weight, there is also anticipation for a material cost reduction effect; when it comes to a sheet material (i.e., a sheet-shaped material), there is demand for increased stiffness and decreased weight—regardless of the material.

In addition, there is demand for a high degree of stiffness over and above that of the conventional art even for, for example, laminated structures that use a sheet material having a concave-convex part that features a high stiffness increase effect, vehicle panels that incorporate a sheet material having a concave-convex part that features a high stiffness increase effect, and the like.

The present invention was conceived considering such problems, and an object of the present invention is to provide a sheet material that increases stiffness by providing a concave-convex part, wherein the sheet material having the concave-convex part pattern exhibits a stiffness increase effect higher than that of the conventional art, and to provide a vehicle panel and a laminated structure using the same.

One aspect of the present invention is a sheet material whose stiffness is increased by the formation of a concave-convex part, wherein a first reference plane, an intermediate reference plane, and a second reference plane, which are three virtual planes that are successively disposed spaced apart and parallel to one another, are used as a reference;

it is assumed that the intermediate reference plane is a grid wherein squares, which are virtual rectangles of the same size, are spread out;

directions parallel to one side of each of the virtual rectangles that constitutes a square are defined as X directions, and directions perpendicular to the X directions are defined as Y directions;

in the intermediate reference plane, X areas each comprise three of the squares linked in the X directions, and Y areas each comprise three of the squares linked in the Y directions;

first reference areas are areas wherein X areas are disposed at both end parts of one of the Y areas—one X area per end part of that Y area—such that the end parts of that Y area contact the center squares of those X areas, and Y areas are disposed at both end parts of those X areas—one Y area per end part of each of those X areas—such that the end parts of those X areas contact the center squares of those Y areas;

in the intermediate reference plane, a plurality of first reference area rows is formed wherein each of the first reference area rows is arrayed in one row in a state wherein its first reference areas are arrayed in the same orientation and the plurality of first reference areas is spaced apart from one another by one square in the X directions;

the first reference area rows that are adjacent in the Y directions in the intermediate reference plane are disposed at positions shifted from one another by three squares in the X directions;

in the intermediate reference plane, all the areas other than the first reference areas are second reference areas;

the concave-convex part is provided with first areas, which protrude from the first reference areas defined in the intermediate reference plane toward the first reference plane, and either or both second areas, which protrude from the second reference areas defined in the intermediate reference plane toward the first reference plane or the second reference plane, and plane areas, which are formed in the intermediate reference plane based on the second reference areas in the intermediate reference plane;

each of the first areas comprises a first top surface, which is a projection of the first reference area into the first reference plane at either unity or reduction magnification, and first side surfaces, which connect the contour of the first top surface with the contour of its first reference area; and each of the second areas comprises a second top surface, which is a projection of the second reference area into the first reference plane or the second reference plane at either unity or reduction magnification, and second side surfaces, which connect the contour of that second top surface with the contour of its second reference area.

Another aspect of the present invention is a laminated structure wherein multiple sheet materials are laminated, wherein at least one of the sheet materials is a sheet material that has the abovementioned concave-convex part.

Yet another aspect of the present invention is a vehicle panel that has an outer panel and an inner panel, which is joined to a rear surface of the outer panel, wherein one or both of the inner panel and the outer panel comprises a sheet material that has the abovementioned concave-convex part.

In the sheet material that has the concave-convex part, the concave-convex part is provided with the first areas, which protrude from the first reference areas defined in the intermediate reference plane toward the first reference plane, and either or both second areas, which protrude from the second reference areas defined in the intermediate reference plane toward the first reference plane or the second reference plane, and the plane areas, which are formed based on the second reference areas in the intermediate reference plane.

Because it has such a structure, the sheet material that has the concave-convex part has superior bending stiffness as well as superior energy absorption characteristics.

Although not wishing to be bound by theory, the following provides a possible reason why the stiffness is increased. Namely, each of the first areas comprises: one of the first top surfaces, which is disposed in the first reference plane disposed at a position that is spaced apart from the neutral plane of the sheet material, and the first side surfaces that intersect in the thickness direction of the sheet material. In addition, each of the second areas comprises the second top surface, which is disposed in the first reference plane or the second reference plane, and the second side surfaces, which intersect the sheet material in the thickness direction. In addition, the plane areas are formed based on the second reference areas disposed in the intermediate reference plane. Consequently, a large amount of the sheet material can be disposed at a position that is spaced apart from the neutral plane of the sheet material. Accordingly, the large amount of material can be used effectively, and thereby the stiffness increase effect can be increased.

In particular, the first areas and the second areas are formed based on the first reference areas and the second reference areas, the shapes and the positional relationship of which are set as mentioned above. Thereby, the second moment of area can be improved in an arbitrary cross section, thereby making it possible to obtain a concave-convex shape with a superior stiffness increase effect and low stiffness anisotropy. Thereby, in the material whose sheet thickness is thin, too, the required stiffness can be obtained, and consequently the weight can be reduced. In addition, attendant with the increase in the stiffness, it is also possible to obtain the effect of improving damping characteristics; in addition, the concave-convex shape makes it possible to obtain the effect of suppressing sound reverberations.

In the abovementioned laminated structure, a laminated structure of extremely high stiffness can be easily obtained by using, as part of the abovementioned laminated structure, the sheet material having the concave-convex part that exhibits the stiffness increase effect as mentioned above. In addition, it is possible to obtain the damping improvement effect attendant with the increase in stiffness, and to obtain the sound absorption improvement effect by virtue of containing air layers.

In the vehicle panel, the sheet material that has the concave-convex part exhibiting the stiffness increase effect as mentioned above is used in the outer panel or the inner panel, or both, and thereby it is possible to easily obtain a vehicle panel whose stiffness is extremely high. In addition, it is possible to obtain the damping improvement effect attendant with the stiffness increase, and to obtain the sound absorption improvement effect by virtue of containing air layers.

DETAILED DESCRIPTION OF EMBODIMENTS

Figure 1:
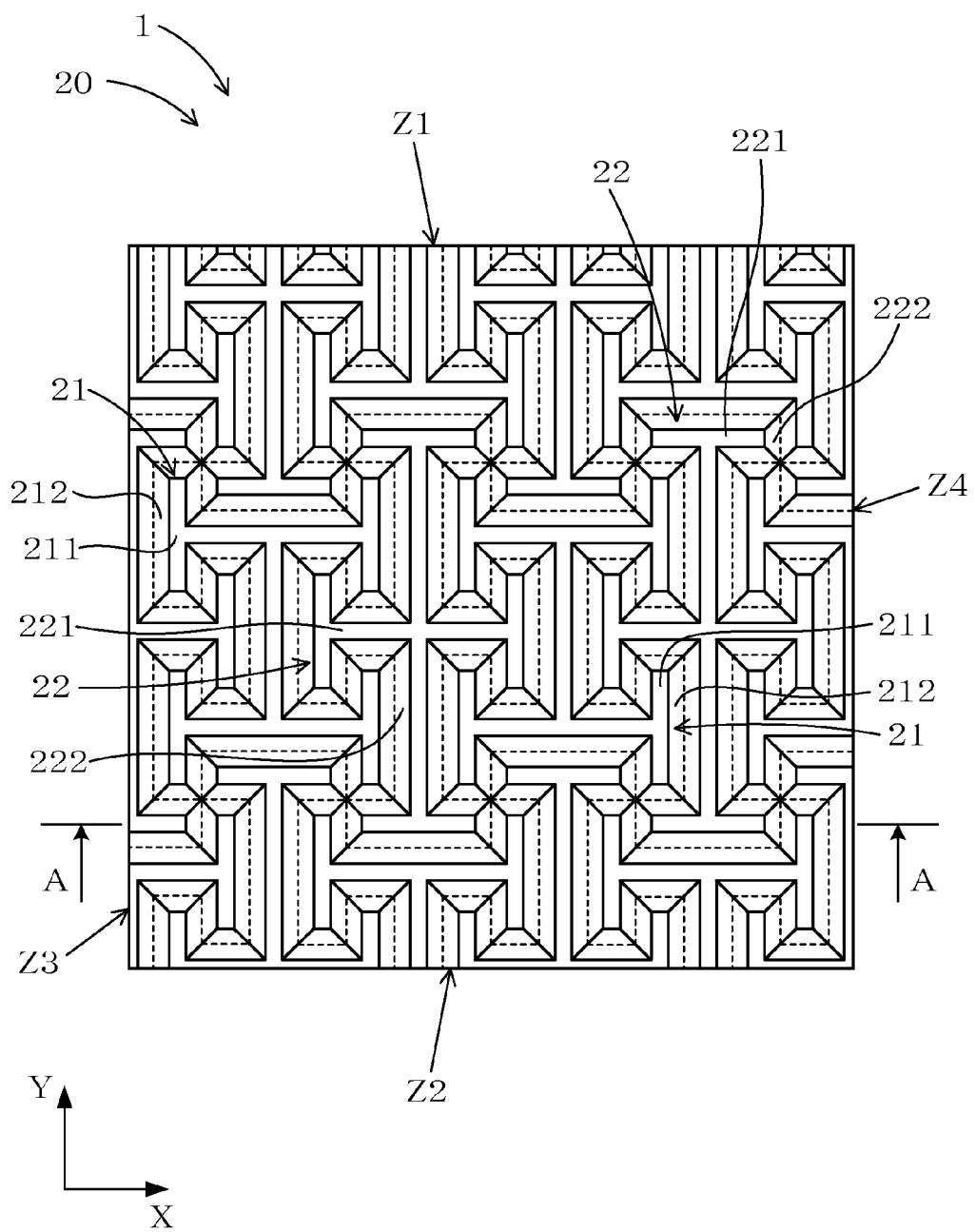
FIG. 1 is a plan view of a sheet material having a concave-convex part according to a first embodiment.

In the present specification, none of the expressions of shape, such as "rectangle," are limited to the narrow concepts of geometry; rather, such expressions include shapes that can be generally recognized as those shapes; for example, shapes that would naturally be allowed include shapes wherein the sides are somewhat curved, so-called fillets wherein a round and the like needed for molding is created in a corner part, a surface, and the like, and shapes provided with a so-called curvature.

In addition, the expression "parallel" is not limited to the narrow concept of geometry and may be anything that can generally be recognized as being parallel.

In addition, the configuration of the concave-convex part changes depending on whether either or both the second areas and the plane areas are formed based on the second reference areas.

If the second areas are formed based on the second reference areas, then the concave-convex part is configured by the first areas and the second areas. At this time, if the second areas are formed such that they protrude from the intermediate reference plane toward the first reference plane, then each of the second areas comprises the second top surface, which is disposed in the first reference plane, and the second side surfaces, which are disposed between the first reference plane and the intermediate reference plane. In addition, if the second areas are formed such that they protrude from the intermediate reference plane toward the second reference plane, then each of the second areas comprises the second top surface, which is disposed in the second reference plane, and the second side surfaces, which are disposed between the second reference plane and the intermediate reference plane.

In addition, if the plane areas are formed based on the second reference areas, then each concave-convex part comprises the first areas and the plane areas.

In addition, it is also possible to form both the second areas and the plane areas based on the second reference areas. In this case, the concave-convex part comprises the first areas, the second areas, and the plane areas.

In addition, it is possible to change, where appropriate, the obtained stiffness and the anisotropy thereof by varying how the second reference areas are distributed in the second areas and the plane areas. At this time, it is preferable that the shape of the concave-convex part, which is formed by two or more of the areas, namely, the first areas, the second areas, and the plane areas, is formed regularly. If the concave-convex part has an irregular shape, then variations in the local stiffness might arise and the stiffness as well as the stiffness anisotropy might become unstable.

In addition, if the second areas are formed such that they protrude from the intermediate reference plane toward the first reference plane and if the plane areas are formed, then two planes, namely, the first reference plane and the intermediate reference plane, are used as a reference; furthermore, if the second areas are formed such that they protrude from the intermediate reference plane toward the second reference plane, then three planes, namely, the first reference plane, the intermediate reference plane, and the second reference plane, are used as a reference.

In addition, the first top surfaces can also be configured by surfaces in the first reference plane or by regions that protrude from the first reference plane in the reverse direction to the direction in which the intermediate reference plane is disposed.

In addition, if the second areas are provided, then the second top surfaces can also be configured by surfaces in the first reference plane or the second reference plane or by regions that protrude in the same direction as the direction in which the second areas protrude. Examples of the shape of the protruding regions include a dome, a ridgeline, and a cone, but the shape of the protruding regions is not limited thereto.

In addition, a length L (mm) of one side of each of the squares and a length M (mm) of the side orthogonal to that one side preferably have the relationship $0.5L \leq M \leq 2L$. In this case, it is possible to both ensure formability and obtain a sufficient bending stiffness increase effect.

If M is less than 0.5L or exceeds 2L, then formation becomes problematic and bending stiffness anisotropy becomes large, neither of which is preferable.

In addition, an inclination angle $\theta_1$ (°) of the first side surface with respect to the intermediate reference plane is preferably in the range of 10°-90°, and an inclination angle $\theta_2$ (°) of the second side surface with respect to the intermediate reference plane is preferably in the range of 10°-90°. In this case, it is possible to obtain a concave-convex part shape that has a superior stiffness increase effect while ensuring formability.

If the inclination angle $\theta_1$ (°) of the first side surface and the inclination angle $\theta_2$ (°) of the second side surface are each less than 10°, then it becomes difficult to increase the height with which the first areas and the second areas protrude, which decreases the stiffness increase effect. In addition, if the inclination angle $\theta_1$ (°) of the first side surface and the inclination angle $\theta_2$ (°) of the second side surface each exceed 90°, then forming the concave-convex part will be problematic, and such an area will not be needed.

Furthermore, in a case wherein a metal sheet is press formed, because of problems with formability, the upper limit value of the inclination angle $\theta_1$ (°) of the first side surface and the upper limit value of the inclination angle $\theta_2$ (°) of the second side surface are more preferably less than or equal to 70°. Accordingly, the range is more preferably 10°-70°.

In addition, the first side surface and the second side surface comprise a plurality of surfaces, but it is not necessary for all of those surfaces to have the same inclination angle; for example, the inclination angle may vary with the region. However, every surface is preferably within the abovementioned preferable inclination angle range.

In addition, at least part of the first reference plane, at least part of the intermediate reference plane, and at least part of the second reference plane are preferably parallel curved surfaces.

In this case, the superior sheet material that has the concave-convex part can be deformed into various shapes, and thereby the range of application can be expanded.

In addition, in a sheet material that has the concave-convex part, the sheet material is preferably one wherein the concave-convex part is formed by press forming a metal sheet. The concave-convex part can be easily formed by plastic working a metal sheet such as by press forming, for example, embossing, or by roll forming. Consequently, the superior concave-convex part shape can be adapted to a metal sheet comparatively easily. Various materials that can be plastically worked, such as aluminum alloy, steel, and copper alloy, can be used as the material of the metal sheet.

Furthermore, in addition to plastic working such as rolling, it is also possible to use casting, cutting, and the like as the forming method.

In addition, as long as it has the concave-convex part, the sheet material is also effective with materials other than metal; for example, the sheet material can also be a resin sheet, a laminated sheet of resin and metal, a composite sheet, and the like. In the case of a resin material and the like, the concave-convex part can be formed by, for example, injection molding or hot pressing. Compared with metal material, resin material tends not to be constrained in its formation and has a greater number of degrees of freedom in its design.

In addition, a sheet thickness t (mm) prior to the formation of the metal sheet is preferably 0.03-6.0 mm. When the sheet thickness of the metal sheet is less than 0.03 mm or exceeds 6.0 mm, there is little need to increase its stiffness in application.

In addition, a ratio L/t of the length L (mm) of the one side that forms the squares to the sheet thickness t (mm) is preferably 10-2000.

If the ratio L/t is less than 10, then there is a risk that forming will become difficult; moreover, if the ratio L/t exceeds 2000, then there is a risk that problems will arise, such as it being no longer possible to sufficiently form the concave-convex part shape, and that stiffness will decrease.

In addition, a ratio $H_1/t$ of a protrusion height $H_1$ (mm) of the first area to the sheet thickness t (mm) and the maximum inclination angle $\theta_1$ (°) formed between the first side surface and the intermediate reference plane preferably have the relationship $1 \leq (H_1/t) \leq -3\theta_1 + 272$; and a ratio $H_2/t$ of a protrusion height $H_2$ (mm) of the second area to the sheet thickness t (mm) and the maximum inclination angle $\theta_2$ (°) formed between the second side surface and the intermediate reference plane preferably have the relationship $1 \leq (H_2/t) \leq -3\theta_2 + 272$.

If the ratio $H_1/t$ is less than 1, then there is a risk that a problem will arise wherein the stiffness increase effect produced by the formation of the first areas will not be sufficient. Moreover, if the ratio $H_1/t$ exceeds $-3\theta_1 + 272$, then there is a risk that a problem will arise wherein forming will become difficult. Likewise, if the ratio $H_2/t$ is less than 1, then there is a risk that a problem will arise wherein the stiffness increase effect produced by the formation of the second areas will not be sufficient. Moreover, if the ratio $H_2/t$ exceeds $-3\theta_2 + 272$, then there is a risk that a problem will arise wherein forming will become difficult.

In addition, in the abovementioned laminated structure, it is possible to configure a laminated body with a three-layer structure wherein the sheet material that has the concave-convex part is used as one core material, and one flat faceplate is provided and disposed on each side thereof. In addition, it is also possible to configure a structure that repeats such a basic structure, namely, a multilayer structure wherein a plurality of the sheet materials, each sheet material having the concave-convex part, is stacked, with a flat faceplate inserted after every sheet material.

In addition, it is also possible to adopt a structure wherein the plurality of sheet materials having the concave-convex parts is directly stacked and used as the core material, and the flat face sheets are joined to a surface on one side thereof or to surfaces on both sides thereof.

In addition, it is also possible to configure a laminated structure in the state wherein the plurality of the sheet materials having the concave-convex parts is just directly stacked.

The number of the sheet materials stacked can be modified in accordance with the application and the required characteristics.

In addition, the abovementioned vehicle panel is not limited to the hood of an automobile and can also be adapted to: a panel, such as a door, a roof, a floor, and a trunk lid; a reinforcing member; and an energy absorbing member, such as a bumper, a crush box, a door beam, and the like. In addition, a steel sheet, an aluminum alloy sheet, or the like can also be used as the outer panel and the inner panel.

If the outer panel comprises an aluminum alloy sheet, then, for example, a 6000 series alloy is ideal because it is relatively low cost. In addition, if the inner panel comprises an aluminum alloy sheet, then, for example, a 5000 series alloy sheet is ideal because it has relatively good formability.

EMBODIMENTS

First Embodiment

An embodiment of a sheet material that has a concave-convex part will now be explained, referencing FIG. 1 through FIG. 3.

FIG. 1 is a plan view of a sheet material 1 having a concave-convex part 20 described in the present embodiment; furthermore, the broken lines shown in the same figure indicate the lines of intersection between an intermediate reference plane K3 and the concave-convex part 20.

Figure 3:
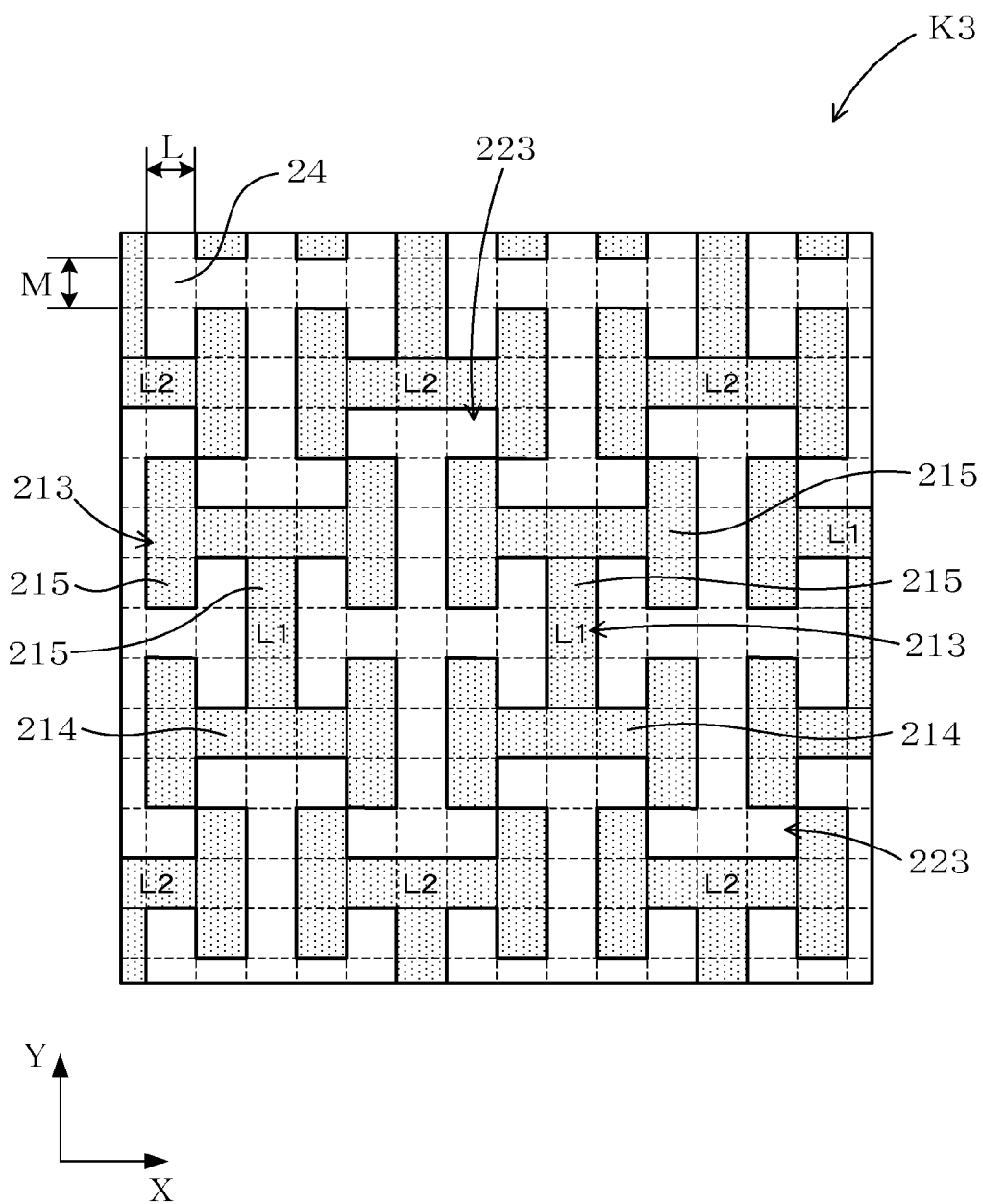
FIG. 3 is an explanatory diagram that shows an intermediate reference plane according to the first embodiment.

In addition, FIG. 3 shows the shape of the concave-convex part 20 of the sheet material 1 described in the present embodiment by the arrangement of first reference areas 213 and second reference areas 223 in the intermediate reference plane K3. In the same figure, the thick solid lines indicate contour lines of the first reference areas 213 and the second reference areas 223, and the fine solid lines drawn on the inner sides of the contour lines of the first reference areas 213 indicate the boundaries between X areas 214 and Y areas 215. In addition, the broken lines in the same figure indicate the contour lines of virtual squares 24 disposed in the intermediate reference plane K3. In addition, the symbols L1, L2 denoted on the inner side of each of the first reference areas 213 indicates the first reference area row to which that first reference area 213 belongs.

Figure 2:
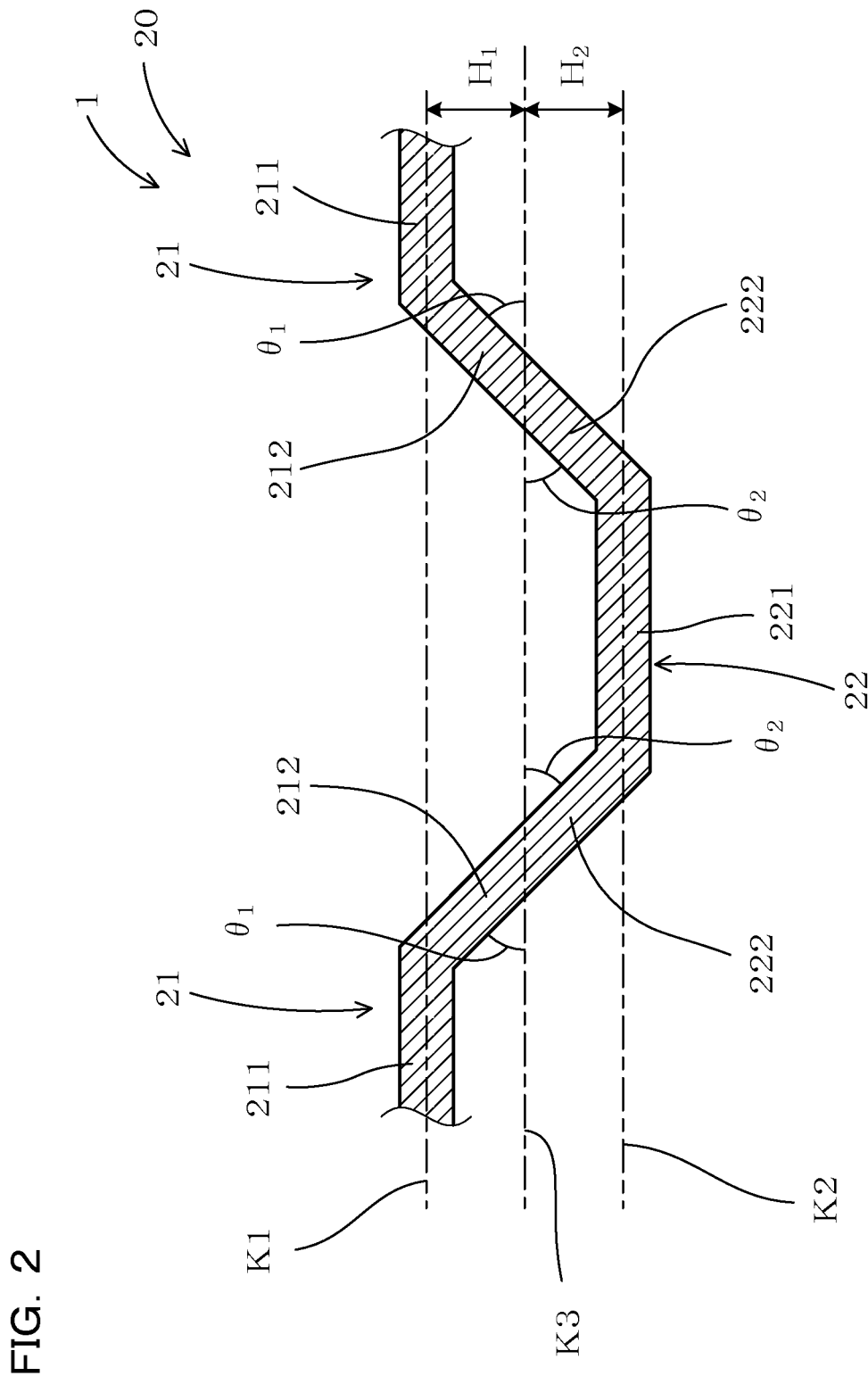
FIG. 2 is a partial enlarged cross sectional view of an auxiliary cross section taken along the A-A line in FIG. 1.

The sheet material 1 of the present embodiment has high stiffness owing to the formation of the concave-convex part 20, as shown in FIG. 1 through FIG. 3.

The concave-convex part 20 is configured as follows.

In the concave-convex part 20, as shown in FIG. 2, reference planes—namely, a first reference plane K1, the intermediate reference plane K3, and a second reference plane K2, which are three virtual planes that are successively disposed spaced apart and parallel to one another—are used as a reference. As shown in FIG. 3, it is assumed that the intermediate reference plane K3 constitutes a grid wherein the squares 24, which are virtual rectangles (i.e., squares) of the same size, are spread out, and wherein the directions parallel to one side of the virtual rectangle that constitutes each of the squares 24 are defined as the X directions and the directions perpendicular to the X directions are defined as the Y directions. In the intermediate reference plane K3, each of the X areas 214 comprises three of the squares 24 linked in the X directions, and each of the Y areas 215 comprises three of the squares 24 linked in the Y directions. The first reference areas 213 are areas wherein the X areas 214 are disposed at both end parts of one of the Y areas 215—one X area 214 per end part of that Y area 215—such that the end parts of that Y area 215 contact the center squares of those X areas 214, and the Y areas 215 are disposed at both end parts of those X areas 214—one Y area 215 per end part of each of those X areas 214—such that the end parts of those X areas 214 contact the center squares of those Y areas 215.

As shown in FIG. 3, in the intermediate reference plane K3, a plurality of the first reference area rows L1, L2 is formed wherein the first reference areas 213 are arrayed in the same orientation and a plurality of the first reference areas 213 in the X directions is arrayed in a row in the state wherein they are spaced apart by one square. The first reference area rows L1 and the first reference area rows L2 are alternately disposed in the Y directions in the intermediate reference plane K3, and the first reference area rows L1, L2 that are adjacent are disposed at positions shifted from one another by three squares in the X directions. In addition, in the intermediate reference plane K3, all the areas other than the first reference areas 213 are the second reference areas 223.

As shown in FIG. 1 and FIG. 2, the concave-convex part 20 comprises: first areas 21, which protrude from the first reference areas 213 (FIG. 3) defined in the intermediate reference plane K3 (FIG. 3) toward the first reference plane K1; and second areas 22, which protrude from the second reference areas 223 (FIG. 3) defined in the intermediate reference plane K3 toward the second reference plane K2. Each of the first areas 21 comprises: a first top surface 211, which is a projection of its first reference area 213 into the first reference plane K1 at reduction magnification; and first side surfaces 212, which connect the contour of the first top surface 211 with the contour of its first reference area 213. Each of the second areas 22 comprises: a second top surface 221, which is a projection of its second reference area 223 into the second reference plane K2 at reduction magnification; and second side surfaces 222, which connect the contour of that second top surface 221 with the contour of its second reference area 223.

In addition, as shown in FIG. 2, the first reference plane K1, the intermediate reference plane K3, and the second reference plane K2 in the present embodiment are mutually parallel planes. The first top surface 211 is configured such that the center of the sheet thickness thereof overlaps the first reference plane K1, and the second top surface 221 is configured such that the center of the sheet thickness thereof overlaps the second reference plane K2. Furthermore, in the present embodiment, the protrusion height $H_1$ of each of the first areas 21 is 1.5 mm, the protrusion height $H_1$ being the distance between the first reference plane K1 and the intermediate reference plane K3. In addition, in the present embodiment, the protrusion height $H_2$ of each of the second areas 22 is 1.5 mm, the protrusion height $H_2$ being the distance between the second reference plane K2 and the intermediate reference plane K3.

In addition, as shown in FIG. 3, the length L (mm) of the sides of the square 24 that are disposed parallel to the X directions and the length M (mm) of the sides disposed parallel to the Y directions are each 8 mm, and therefore the squares 24 are square shaped.

In addition, as shown in FIG. 2, the inclination angle $\theta_1$ of each of the first side surfaces 212 with respect to the intermediate reference plane K3 and the inclination angle $\theta_2$ of each of the second side surfaces 222 with respect to the intermediate reference plane K3 are each 30°.

In addition, in the present embodiment, the sheet material 1 that has the concave-convex part 20 is a 1000 series aluminum sheet whose sheet thickness t=0.3 mm. The concave-convex part 20 is press formed using a pair of molds. Furthermore, it is also possible to use, as the forming method, some other plastic working method such as roll forming that forms by using a pair of forming rolls, the surfaces of which are profiled with the desired concave-convex shape.

In addition, the ratio L/t of the length L (mm) of the sides disposed parallel to the X directions to the sheet thickness t (mm) of the aluminum sheet is 26.67 and is within a range of 10-2000.

In addition, the ratio $H_1/t$ of the protrusion height $H_1$ (mm) of each of the first areas 21 to the sheet thickness t (mm) is 5. In addition, the inclination angle $\theta_1$ formed by each of the first side surfaces 212 and the intermediate reference plane K3 is 30°, and $-3\theta_1+272=182$. Accordingly, the relationship $1 \leq H_1/t \leq 182$ is satisfied. Likewise, the ratio $H_2/t$ of the protrusion height $H_2$ (mm) of each of the second areas 22 to the sheet thickness t (mm) is 5. In addition, the inclination angle $\theta_2$ formed by each of the second side surfaces 222 and the intermediate reference plane K3 is 30°, and $-3\theta_2+272=182$. Accordingly, the relationship $1 \leq H_2/t \leq 182$ is satisfied.

Next, the operation and effects of the sheet material 1 that has the concave-convex part 20 according to the present embodiment will be explained.

As mentioned above, the concave-convex part 20 is provided with: the first areas 21, which protrude from the first reference areas 213 defined in the intermediate reference plane K3 toward the first reference plane K1; and the second areas 22, which protrude from the second reference areas 223 defined in the intermediate reference plane K3 toward the second reference plane K2. Furthermore, each of the first areas 21 comprises the first top surface 211 and the first side surfaces 212, which connect the contour of the first top surface 211 with the contour of its first reference area 213; in addition, each of the second areas 22 comprises the second top surface 221 and the second side surfaces 222, which connect the contour of that second top surface 221 with the contour of its second reference area 223.

Because it has such a structure, the sheet material 1 having the concave-convex part 20 of the present embodiment has superior bending stiffness as well as superior energy absorption characteristics.

The following considers reasons why the stiffness is increased. Namely, as shown in FIG. 2, each of the first areas 21 comprises: one of the first top surfaces 211, which is disposed in the first reference plane K1 disposed at a position that is spaced apart from the neutral plane of the sheet material 1; and the first side surfaces 212 that intersect in the thickness directions of the sheet material 1. In addition, each of the second areas 22 comprises: one of the second top surfaces 221, which is disposed in the second reference plane K2 disposed at a position that is spaced apart from the neutral plane of the sheet material 1; and the second side surfaces 222 that intersect in the thickness directions of the sheet material 1. Consequently, a large amount of material can be disposed at a position that is spaced apart from the neutral plane of the sheet material 1. Accordingly, the large amount of material can be used effectively, and thereby the stiffness increase effect can be increased greatly.

In particular, the first areas 21 and the second areas 22 are formed based on the first reference areas 213 and the second reference areas 223, with the shape and the positional relationship set as mentioned above. The shape and the positional relationship of each of the first reference areas 213, which is the basic shape, are set as mentioned above. Thereby, the second moment of area can be improved in an arbitrary cross section, thereby making it possible to obtain a concave-convex shape with a superior bending stiffness increase effect and low stiffness anisotropy. Thereby, in the material whose sheet thickness is thin, too, the required stiffness can be obtained, and consequently the weight can be reduced. In addition, attendant with the increase in the stiffness, it is also possible to obtain the effect of improving damping characteristics; in addition, the concave-convex shape makes it possible to obtain the effect of suppressing sound reverberations.

(FEM Analysis)

To quantitatively determine the stiffness increase effect of the sheet material 1 of the present embodiment, a bending stiffness evaluation of a cantilevered beam was performed by FEM analysis.

In the FEM analysis, the bending stiffness evaluation was performed in three directions, namely, 0°, 45°, and 90°, by changing the forming direction of the concave-convex part 20 in a test piece.

The test piece used in the FEM analysis has a rectangular shape measuring 120×120 mm, and the concave-convex part 20 is formed over the entire surface thereof. Furthermore, taking the increase in the surface area into consideration, the sheet thickness t was 0.272 mm.

With reference to the end parts of the test piece, one end was designated as a fixed end, and the end part disposed opposing that fixed end was designated as a free end. A load of 1 N was applied to the center part of the side formed by the free end, and the amount of deflection of the sheet material 1 was derived by performing the FEM analysis.

The evaluation was performed by comparing the amount of deflection obtained by conducting the same FEM analysis on the flat sheet shaped original sheet whereon the concave-convex part 20 is not formed.

<0° Direction>

As shown in FIG. 1, in the test piece wherein the concave-convex part 20 is formed such that the X directions in the intermediate reference plane K3 (FIG. 3) and the sides formed by the sheet material 1 are parallel, the direction wherein an end part Z1 located above in the same figure is the fixed end and an end part Z2 opposing the end part Z1 is the free end is designated the 0° direction.

The sheet material 1 that has the concave-convex part 20 of the first embodiment was compared, in the 0° direction discussed above, with the flat sheet shaped original sheet, and it was obvious that the bending stiffness increased by 22.46 times.

<45° Direction>

In the test piece wherein the concave-convex part 20 is formed such that the angle formed between the X directions in the intermediate reference plane K3 (FIG. 3) and the sides of the sheet material 1 is 45°, the direction wherein an end part located above is the fixed end and an end part opposing the fixed end is the free end is designated the 45° direction.

The sheet material 1 that has the concave-convex part 20 of the first embodiment was compared, in the 45° direction discussed above, with the flat sheet shaped original sheet, and it was obvious that the bending stiffness increased by 13.06 times.

<90° Direction>

As shown in FIG. 1, in the test piece wherein the concave-convex part 20 is formed such that the X directions in the intermediate reference plane K3 (FIG. 3) and the sides of the sheet material 1 are parallel, the direction wherein an end part Z3 located on the left side in the same figure is the fixed end and an end part Z4 opposing the end part Z3 is the free end is designated the 90° direction.

The sheet material 1 that has the concave-convex part 20 of the first embodiment was compared, in the 90° direction discussed above, with the flat sheet shaped original sheet, and it was obvious that the bending stiffness increased by 12.22 times.

Based on the result of the FEM analysis, with respect to the sheet material 1 that has the concave-convex part 20 described in the present embodiment, in the 90° direction, which is the direction in which the bending stiffness increase effect is lowest, the stiffness multiplier G is expected to be 12.22 times that of a flat sheet, and the weight reduction factor W (%) is expected to be at least approximately 56% of a flat sheet. Furthermore, the weight reduction factor W (%) is derived using the stiffness multiplier G based on the formula $W=(1-1/\sqrt[3]{G})\times 100$.

In addition, in the present embodiment, the shape of the concave-convex part 20 in the 135° direction is the same as in the 45° direction, and the shape of the concave-convex part 20 in the 180° direction is the same as in the 0° direction. Accordingly, the result of the FEM analysis is the same for both the 135° direction and the 45° direction, and is likewise the same for the 180° direction and the 0° direction.

Second Embodiment

The sheet material 1 having the concave-convex part 20 according to the present embodiment will now be explained, referencing FIG. 4 and FIG. 5.

The present embodiment describes an example wherein the configuration of the concave-convex part 20 has been changed using the same intermediate reference plane K3 (FIG. 3) as in the first embodiment. Furthermore, in the present embodiment, two planes, namely, the first reference plane K1 and the intermediate reference plane K3, are used as a reference, but the second reference plane K2 is not used.

Figure 4:
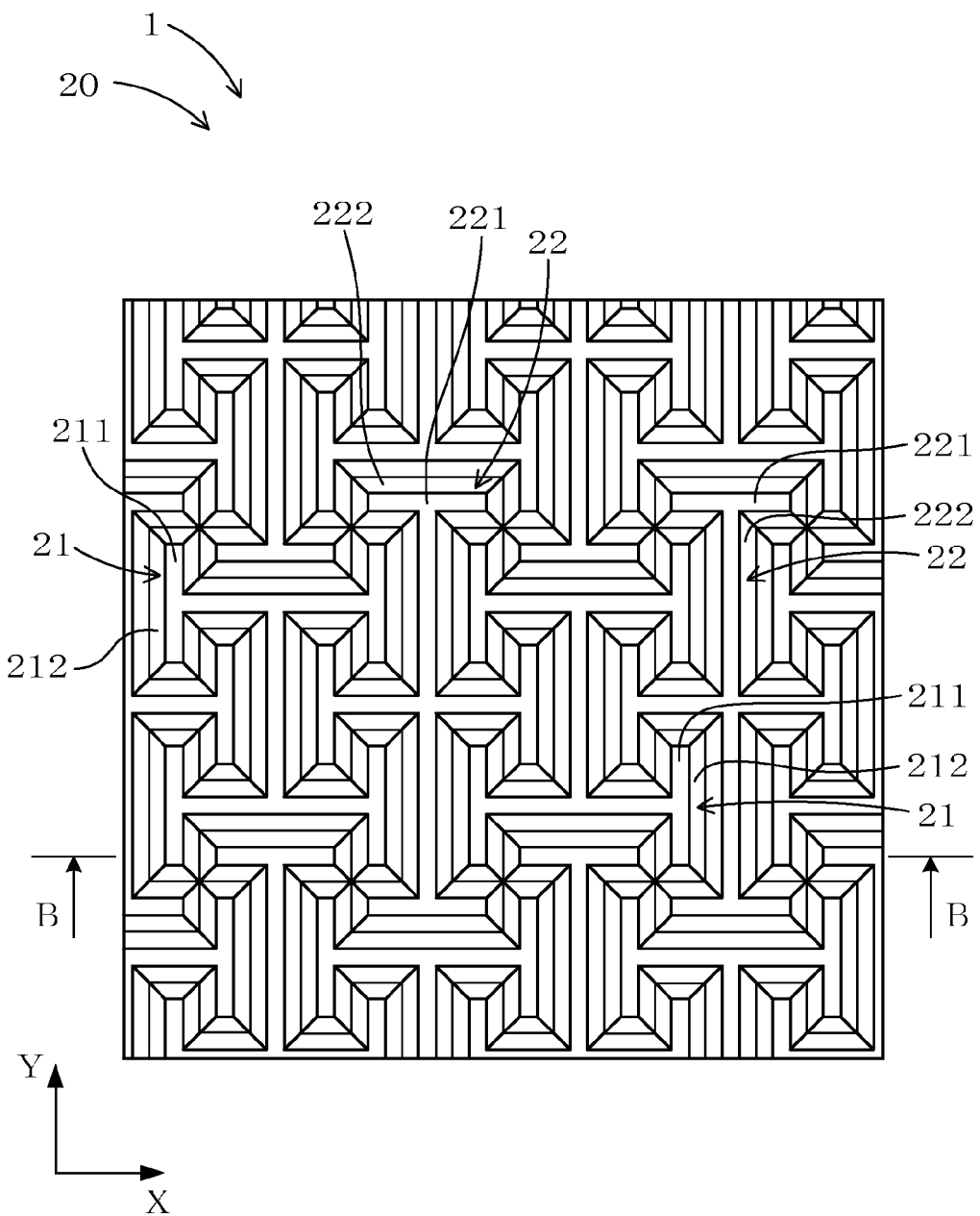
FIG. 4 is a plan view of the sheet material having the concave-convex part, which comprises first areas and second areas, according to a second embodiment.
Figure 5:
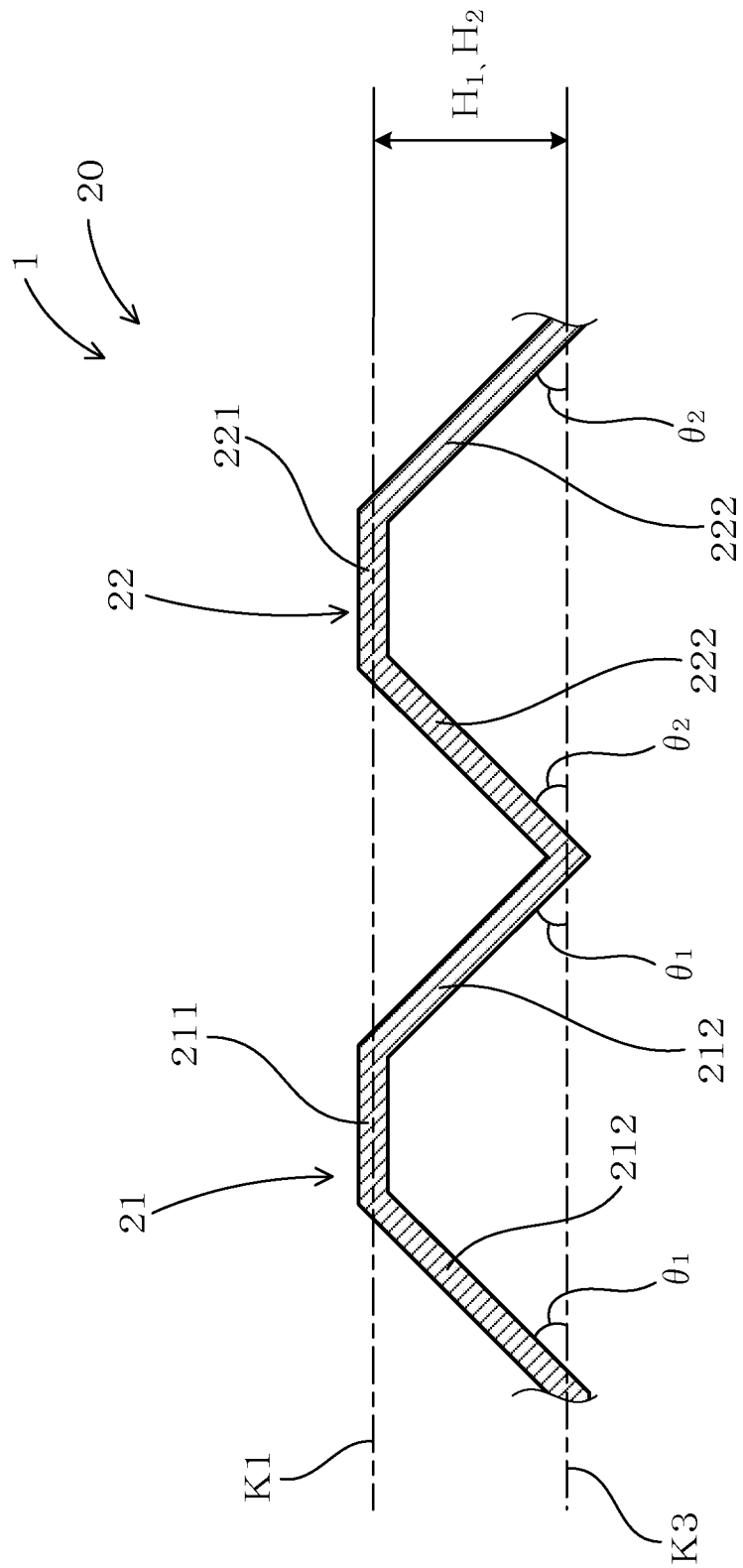
FIG. 5 is a partial enlarged cross sectional view of an auxiliary cross section taken along the B-B line in FIG. 4.

The sheet material 1 shown in FIG. 4 has the concave-convex part 20 comprising the first areas 21 and the second areas 22, which protrude toward the first reference plane K1. As shown in FIG. 4 and FIG. 5, each of the second areas 22 of the present embodiment comprises the second top surface 221, which is a reduced projection of its second reference area 223 (FIG. 3) into the first reference plane K1, and the second side surfaces 222, which connect the contour of that second top surface 221 and the contour of that second reference area 223. The second areas 22 of the present embodiment are formed such that they protrude from the intermediate reference plane K3 to the first reference plane K1, as described above, and the protrusion direction is the opposite of that of the first embodiment. Accordingly, in the present embodiment, the protrusion height $H_2$ of the second areas 22 and the protrusion height $H_1$ of the first areas 21 are equal. Other aspects of the configurations of the first areas 21 and the second areas 22 are the same as those of the first embodiment.

Third Embodiment

The sheet material 1 having the concave-convex part 20 according to the present embodiment will now be explained, referencing FIG. 6 and FIG. 7.

The present embodiment describes an example wherein the configuration of the concave-convex part 20 has been changed using the same intermediate reference plane K3 (FIG. 3) as in the first embodiment. Furthermore, in the present embodiment, two planes, namely, the first reference plane K1 and the intermediate reference plane K3, are used as a reference, but the second reference plane K2 is not used.

Figure 6:
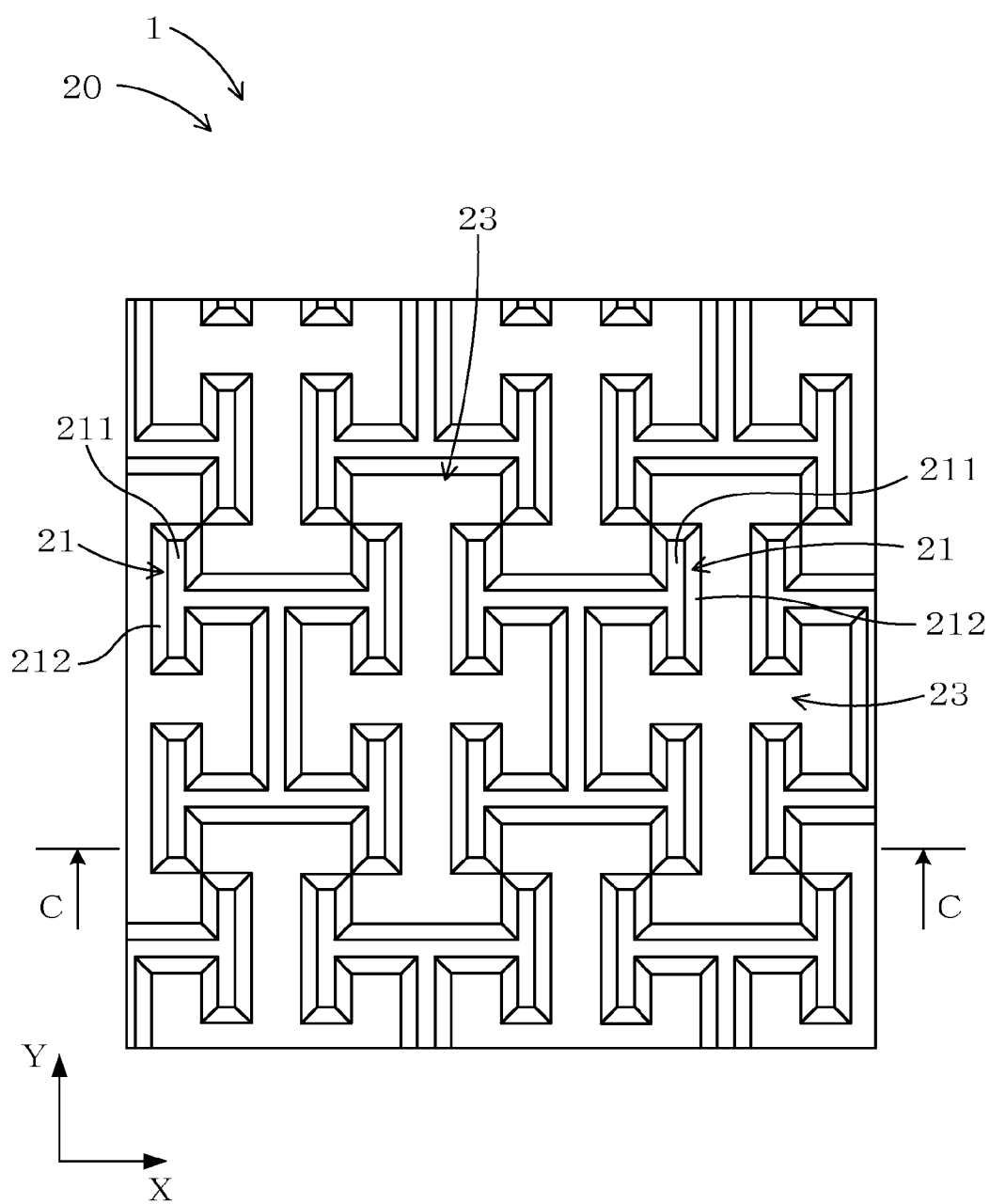
FIG. 6 is a plan view of the sheet material having the concave-convex part comprising the first areas and plane areas according to a third embodiment.
Figure 7:
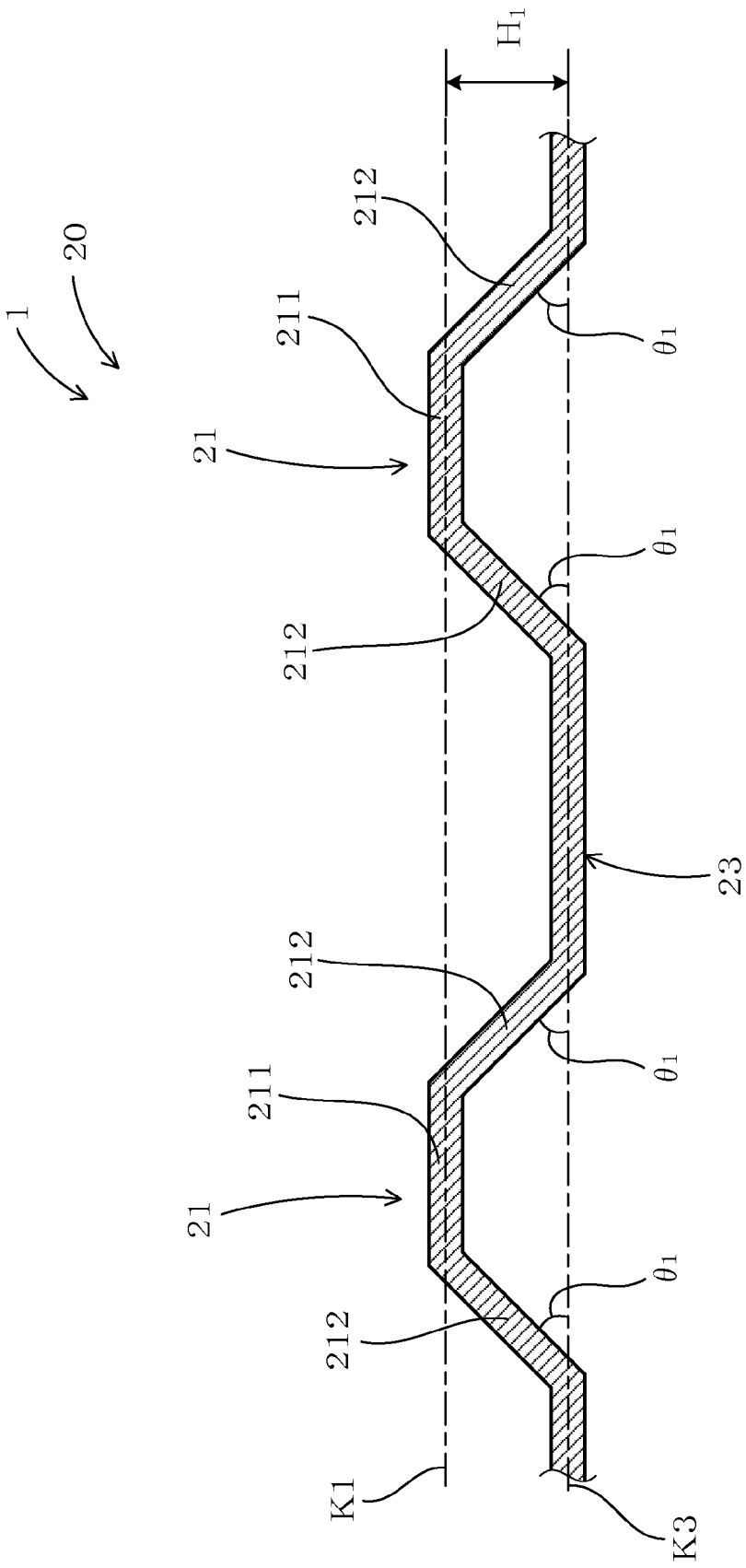
FIG. 7 is a partial enlarged cross sectional view of an auxiliary cross section taken along the C-C line in FIG. 6.

The sheet material 1 shown in FIG. 6 has the concave-convex part 20, which comprises the first areas 21 and plane areas 23. The plane areas 23 are formed by the contours of the second reference areas 223 (FIG. 3) in the intermediate reference plane K3 (FIG. 3), as shown in FIG. 6 and FIG. 7. In addition, the configuration of the first areas 21 is the same as in the first embodiment.

In the sheet material 1 having the concave-convex part 20 described in the present embodiment, too, it is possible to obtain the sheet material 1 with low bending stiffness anisotropy and a high bending stiffness increase effect.

Fourth Embodiment

Figure 8:
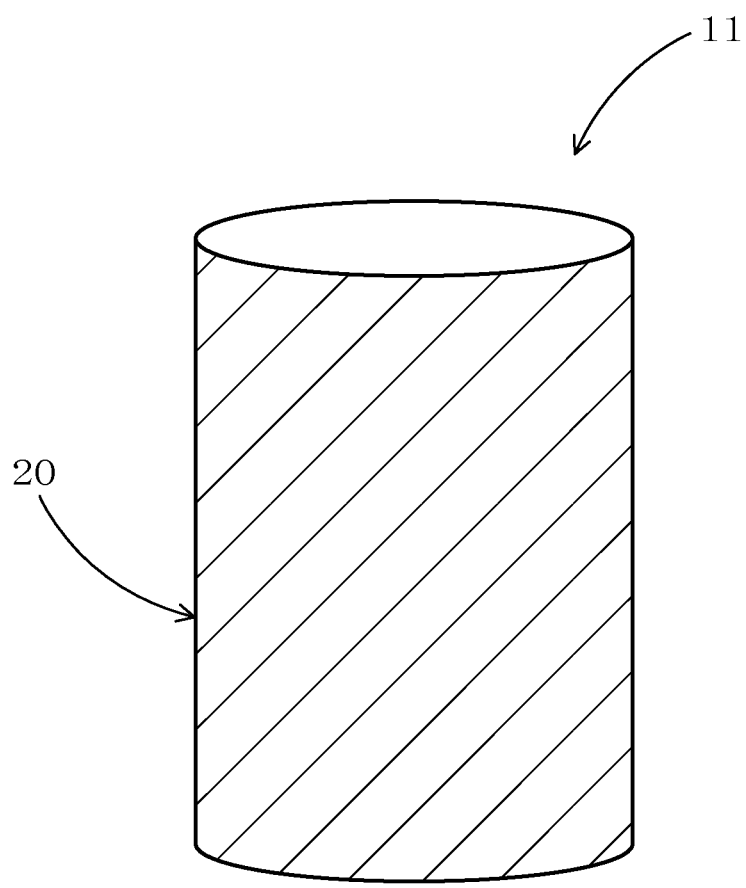
FIG. 8 is an explanatory diagram that shows, according to a fourth embodiment, a cylindrical member that comprises the concave-convex part.

The present embodiment, as shown in FIG. 8, is an example wherein the concave-convex part 20 is provided to a cylindrical member 11. In the present embodiment, the first reference plane K1, the intermediate reference plane K3, and the second reference plane K2 are cylindrical curved planes that are disposed parallel to one another. The intermediate reference plane K3 in the present embodiment is the planar intermediate reference plane K3 according to any one of the first through third embodiments that has been bent into a cylindrical shape. The configurations of the first areas 21, the second areas 22, and the plane areas 23, which constitute the concave-convex part 20, are the same as in the first and second embodiments.

As described in the present embodiment, the sheet material 1 that has the concave-convex part 20 provided with superior characteristics can be deformed into a variety of shapes, thereby expanding its range of application.

In addition, by using a cylindrical structure like a beverage can or a rocket, it is possible to increase the stiffness of the cylindrical member 11 that has the concave-convex part 20 described in the present embodiment without increasing the sheet thickness of the material. In addition, the cylindrical member 11 of the present embodiment has superior energy absorption characteristics. Consequently, using such in a vehicle body of an automobile and the like imparts high stiffness and superior energy absorption characteristics.

Fifth Embodiment

Figure 9:
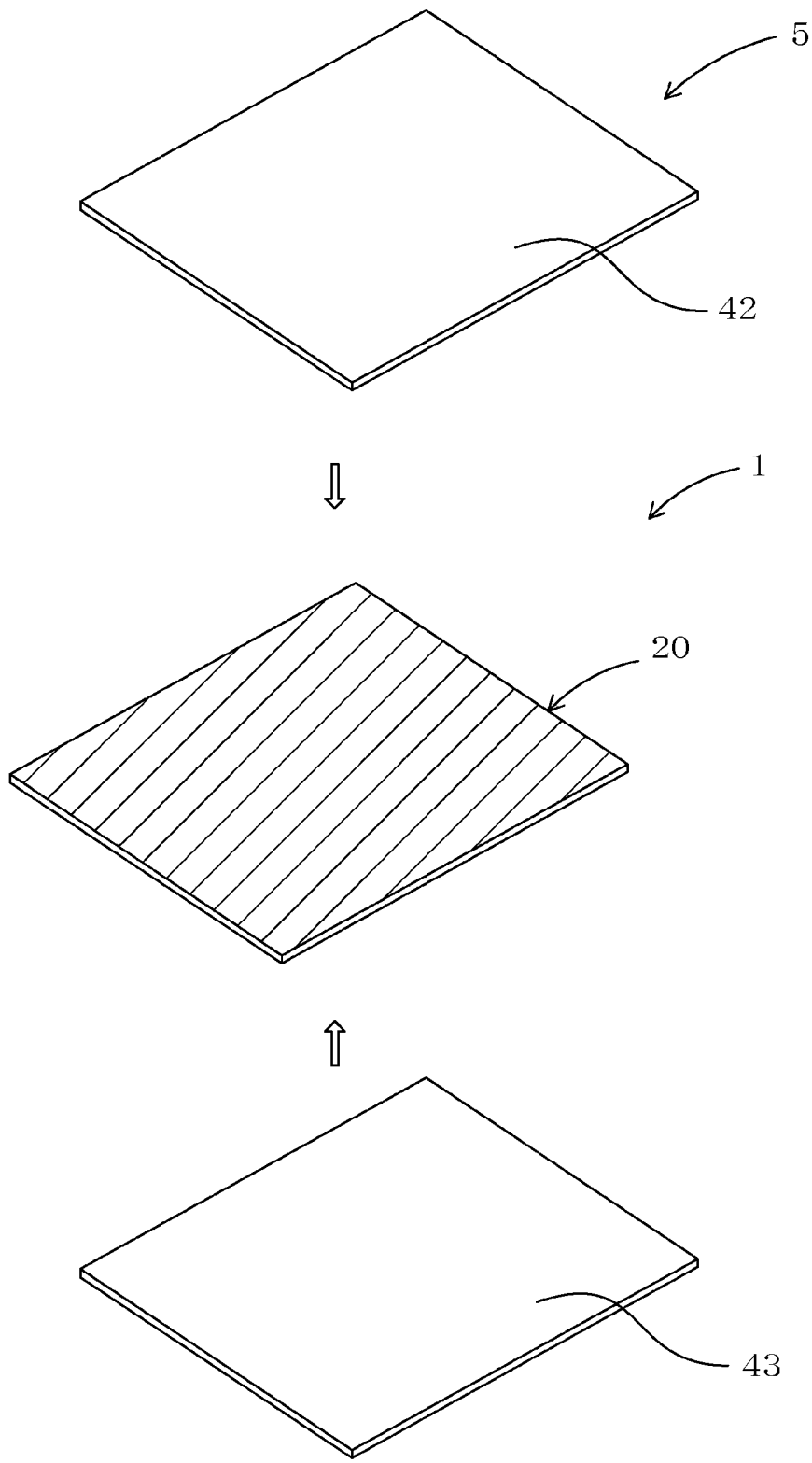
FIG. 9 is an explanatory development view of a laminated structure according to a fifth embodiment.

The present embodiment, as shown in FIG. 9, is an example wherein a laminated structure 5 is configured using as the core material the sheet material 1 that has the concave-convex part 20 of the first embodiment.

Namely, the laminated structure 5 joins face sheets 42, 43 to the surfaces on both sides of the core material, which consists of one sheet material 1 that has the concave-convex part 20.

The face sheets 42, 43 are aluminum alloy sheets that are made of 3000 series material and whose sheet thickness is 1.0 mm.

In the laminated structure 5 of the present embodiment, the sheet material 1 that has the concave-convex part 20, which has superior stiffness as discussed above, is used as the core material, and the face sheets 42, 43 are joined, by bonding, brazing, and the like, to the first top surfaces 211 of the first areas 21 and the second top surfaces 221 of the second areas 22; thereby, the laminated structure 5 obtains a remarkably higher stiffness than the sheet material 1 that has the concave-convex part 20 does as a standalone. Moreover, because both the sheet material 1 and the face sheets 42, 43 are aluminum alloy sheets, the weight is also reduced.

In addition, it is possible to obtain the damping improvement effect attendant with the increase in stiffness, and to obtain the sound absorption improvement effect by virtue of containing air layers. In addition, as is well known, the sound absorbing characteristics can be further improved via the formation of a through hole in either of the face sheets 42, 43 so as to form a Helmholtz sound-absorbing structure.

Furthermore, it is also possible to use, as the face sheets 42, 43, a sheet made of resin or a metal other than an aluminum alloy, for example, a steel sheet or a titanium sheet.

Sixth Embodiment

Figure 10:
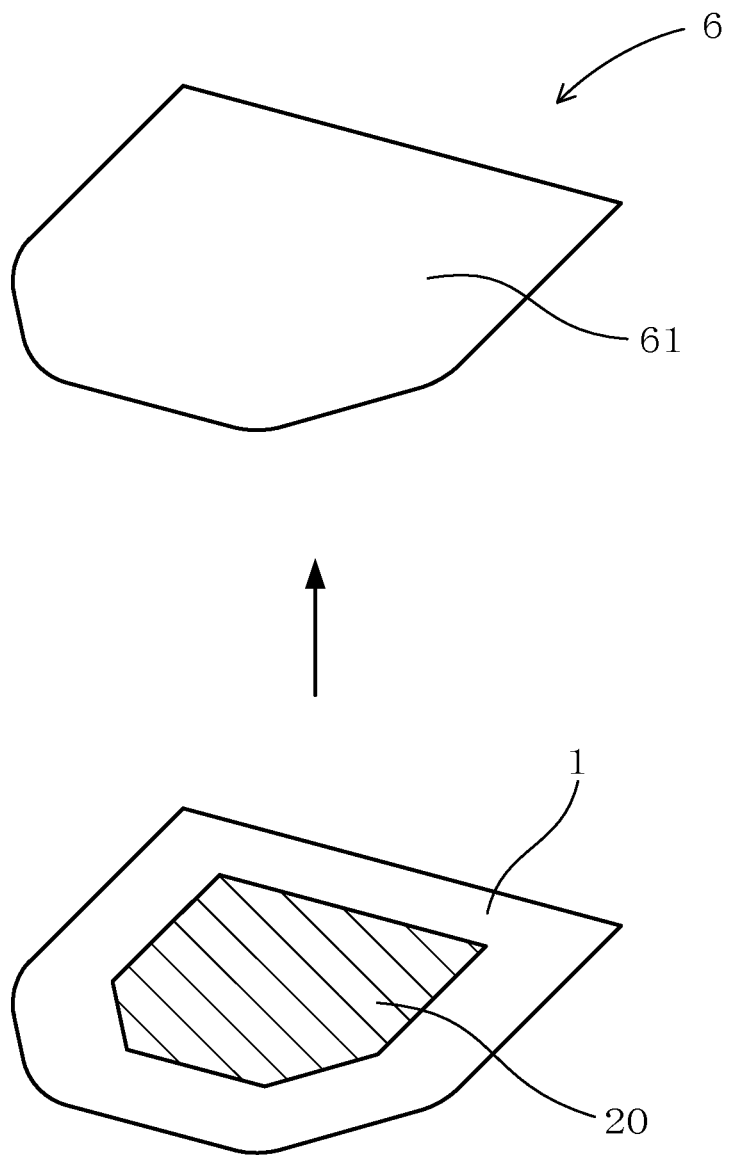
FIG. 10 is an explanatory development view of a vehicle panel according to a sixth embodiment.

The present embodiment, as shown in FIG. 10, is an example of a vehicle panel 6 that is configured by using as the inner panel the sheet material 1 according to any one of the first through third embodiments and by disposing the surfaces of the sheet material 1 on the first reference plane K1 side toward a rear surface side of an outer panel 61. The outer panel 61 is joined, by hemming and the like, to an outer circumferential part of the inner panel. Furthermore, in the inner panel discussed above, the forming direction of the concave-convex part 20 is not limited; for example, a configuration can also be adopted wherein the surface of the sheet material 1 on the side opposite to the first reference plane K1 is disposed such that it faces the rear surface side of the outer panel 61.

In the vehicle panel 6 of the present embodiment, the sheet material 1 that has the concave-convex part 20 and that constitutes the inner panel of the vehicle panel 6 obtains an excellent stiffness increase effect, as mentioned above, and therefore has the excellent characteristic of absorbing the energy of a primary impact as well as the energy of a secondary impact in the event the vehicle collides with a pedestrian. In addition, it is possible to obtain the damping improvement effect attendant with the increase in stiffness and to obtain the sound absorption improvement effect by virtue of containing air layers.

Furthermore, in the present embodiment, the sheet material 1 that has the concave-convex part 20 is used as the inner panel, but the sheet material 1 can also be used as the inner panel or the outer panel 61, or both.

The invention claimed is:

1. A sheet material having a stiffness-increasing concave-convex part, wherein
a first reference plane, an intermediate reference plane, and a second reference plane, which are three virtual planes that are successively disposed spaced apart and parallel to one another, serve as a reference system;
the intermediate reference plane includes a grid of virtual squares of the same size;
directions parallel to one side of each of the virtual squares are defined as X directions, and directions perpendicular to the X direction are defined as Y directions;
in the intermediate reference plane, X areas each comprise three of the virtual squares linked in the X directions, and Y areas each comprise three of the virtual squares linked in the Y directions;
first reference areas are areas wherein X areas are disposed at both end parts of one of the Y areas—one X area per end part of that Y area—such that the end parts of that Y area contact center squares of those X areas, and Y areas are disposed at both end parts of those X areas—one Y area per end part of each of those X areas—such that the end parts of those X areas contact center squares of those Y areas;
in the intermediate reference plane, a plurality of first reference area rows is formed, wherein each of the first reference area rows is arrayed in one row in a state and wherein its first reference areas are arrayed in the same orientation and the plurality of first reference areas are spaced apart from one another by one square in the X directions;
the first reference area rows that are adjacent in the Y directions in the intermediate reference plane are disposed at positions shifted from one another by three squares in the X directions;
in the intermediate reference plane, all the areas other than the first reference areas are second reference areas;
the concave-convex part is provided with first areas, which protrude from the first reference areas defined in the intermediate reference plane toward the first reference plane, and is further provided with either or both of (i) second areas, which protrude from the second reference areas defined in the intermediate reference plane toward the first reference plane or the second reference plane, and (ii) plane areas, which are formed in the intermediate reference plane based on the second reference areas in the intermediate reference plane;

each of the first areas comprises a first top surface, which is a projection of the first reference area into the first reference plane and has an area equal to or less than the first reference area, and first side surfaces, which connect an outer periphery of the first top surface with an outer periphery of its first reference area; and each of the second areas comprises a second top surface, which is a projection of the second reference area into the first reference plane or the second reference plane and has an area equal to or less than the second reference area, and second side surfaces, which connect an outer periphery of that second top surface with an outer periphery of its second reference area.

2. The sheet material according to claim 1, wherein
a first inclination angle $\theta_1$ (°) of the first side surface with respect to the second reference plane is within the range of 10°-90°; and
a second inclination angle $\theta_2$ (°) of the second side surface with respect to the second reference plane is within the range of 10°-90°.

3. The sheet material according to claim 1, wherein
at least a part of the sheet material is curved.

4. The sheet material according to claim 1, wherein
the concave-convex part is formed by press forming or roll forming a metal sheet.

5. The sheet material according to claim 4, wherein
the metal sheet prior to the press forming or the roll forming has a sheet thickness t (mm) of 0.03-6.0 mm.

6. The sheet material according to claim 5, wherein
a ratio L/t of the length L (mm) of one side of each virtual square to the sheet thickness t (mm) is 10-2000.

7. The sheet material according to claim 5, wherein
a ratio H1/t of a projection height H1 (mm) of the first area to the sheet thickness t (mm), and a maximum inclination angle $\theta_1$ (°) formed between each first side surface and the intermediate reference plane satisfy the relationship $1 \leq (H1/t) \leq -3\theta_1 + 272$; and
a ratio H2/t of a projection height H2 (mm) of the second area to the sheet thickness t (mm), and a maximum inclination angle $\theta_2$ (°) formed between each second side surface and the intermediate reference plane satisfy the relationship $1 \leq (H2/t) \leq -3\theta_2 + 272$.

8. The sheet material according to claim 7, wherein
the first maximum inclination angle $\theta_1$ (°) of the first side surface with respect to the second reference plane is within the range of 10°-70°; and
the second maximum inclination angle $\theta_2$ (°) of the second side surface with respect to the second reference plane is within the range of 10°-70°.

9. The sheet material according to claim 1,
wherein the X areas disposed at both end parts of the one of the Y areas comprise first and second X areas,
wherein the Y areas disposed at both end parts of those X areas comprise a first Y area disposed at a first end of the first X area, a second Y area disposed at a second end of the first X area, a third Y area disposed at a first end of the second X area and a fourth Y area disposed at a second end of the second X area,
wherein the first and third Y areas are disposed to a first side of the one of the Y areas and the second and fourth Y areas are disposed to a second side of the one of the Y areas, and
wherein the first Y area is spaced from the third Y area in the Y direction by a first one of the second reference areas and the second Y area is spaced from the fourth Y area in the Y direction by a second one of the second reference areas; and further comprising areas which protrude from the first, second, third, and fourth Y areas.

10. A sheet material having a stiffness-increasing concave-convex part, wherein
a first reference plane, an intermediate reference plane, and a second reference plane, which are three virtual planes that are successively disposed spaced apart and parallel to one another, serve as a reference system;
the intermediate reference plane includes a grid of virtual rectangles of the same size;
directions parallel to one side of each of the virtual rectangles are defined as X directions, and directions perpendicular to the X direction are defined as Y directions;
in the intermediate reference plane, X areas each comprise three of the virtual rectangles linked in the X directions, and Y areas each comprise three of the virtual rectangles linked in the Y directions;
first reference areas are areas wherein X areas are disposed at both end parts of one of the Y areas—one X area per end part of that Y area—such that the end parts of that Y area contact center rectangles of those X areas, and Y areas are disposed at both end parts of those X areas—one Y area per end part of each of those X areas—such that the end parts of those X areas contact center rectangles of those Y areas;
in the intermediate reference plane, a plurality of first reference area rows is formed, wherein each of the first reference area rows is arrayed in one row in a state and wherein its first reference areas are arrayed in the same orientation and the plurality of first reference areas are spaced apart from one another by one rectangle in the X directions;
the first reference area rows that are adjacent in the Y directions in the intermediate reference plane are disposed at positions shifted from one another by three rectangles in the X directions;
in the intermediate reference plane, all the areas other than the first reference areas are second reference areas;
the concave-convex part is provided with first areas, which protrude from the first reference areas defined in the intermediate reference plane toward the first reference plane, and is further provided with either or both of (i) second areas, which protrude from the second reference areas defined in the intermediate reference plane toward the first reference plane or the second reference plane, and (ii) plane areas, which are formed in the intermediate reference plane based on the second reference areas in the intermediate reference plane;
each of the first areas comprises a first top surface, which is a projection of the first reference area into the first reference plane and has an area equal to or less than the first reference area, and first side surfaces, which connect an outer periphery of the first top surface with an outer periphery of its first reference area; and
each of the second areas comprises a second top surface, which is a projection of the second reference area into the first reference plane or the second reference plane and has an area equal to or less than the second reference area, and second side surfaces, which connect an outer periphery of that second top surface with an outer periphery of its second reference area,
wherein the virtual rectangles that comprise the first and second reference areas have a length L (mm) of one side of the rectangle and a length M (mm) of a side of the rectangle that is orthogonal to the one side of the rectangle that have the relationship $0.5L \leq M \leq 2L$.

11. The sheet material according to claim 10, wherein a first inclination angle $\theta_1$ (°) of the first side surface with respect to the second reference plane is within the range of 10°-90°; and a second inclination angle $\theta_2$ (°) of the second side surface with respect to the second reference plane is within the range of 10°-90°.

12. The sheet material according to claim 10, wherein at least a part of the sheet material is curved.

13. The sheet material according to claim 10, wherein the concave-convex part is formed by press forming or roll forming a metal sheet.

14. The sheet material according to claim 13, wherein the metal sheet prior to the press forming or the roll forming has a sheet thickness t (mm) of 0.03-6.0 mm.

15. The sheet material according to claim 14, wherein a ratio L/t of the length L (mm) of one side of each virtual rectangle to the sheet thickness t (mm) is 10-2000.

16. The sheet material according to claim 14, wherein a ratio $H_1/t$ of a protrusion height $H_1$ (mm) of the first area to the sheet thickness t (mm), and a maximum inclination angle $\theta_1$ (°) formed between each first side surface and the intermediate reference plane satisfy the relationship $1 \leq (H_1/t) \leq 3\theta_1 + 272$; and a ratio $H_2/t$ of a protrusion height H2 (mm) of the second area to the sheet thickness t (mm) and a maximum inclination angle $\theta_2$ (°) formed between each second side surface and the intermediate reference plane satisfy the relationship $1 \leq (H_2/t) \leq -3\theta_2 + 272$.

17. The sheet material according to claim 16, wherein the first maximum inclination angle $\theta_1$ (°) of the first side surface with respect to the second reference plane is within the range of 10°-70°; and the second maximum inclination angle $\theta_2$ (°) of the second side surface with respect to the second reference plane is within the range of 10°-70°.

18. The sheet material according to claim 17, wherein the first and second maximum inclination angles are each 30°.

19. The sheet material according to claim 17, wherein a ratio L/t of the length L (mm) of one side of each virtual rectangle to the sheet thickness t (mm) is 10-2000.

20. The sheet material according to claim 10, wherein the X areas disposed at both end parts of the one of the Y areas comprise first and second X areas, wherein the Y areas disposed at both end parts of those X areas comprise a first Y area disposed at a first end of the first X area, a second Y area disposed at a second end of the first X area, a third Y area disposed at a first end of the second X area and a fourth Y area disposed at a second end of the second X area, wherein the first and third Y areas are disposed to a first side of the one of the Y areas and the second and fourth Y areas are disposed to a second side of the one of the Y areas, and wherein the first Y area is spaced from the third Y area in the Y direction by a first one of the second reference areas and the second Y area is spaced from the fourth Y area in the Y direction by a second one of the second reference areas; and further comprising areas which protrude from the first, second, third, and fourth Y areas.

* * * * *